United States Patent Office 2,721,783
Patented Oct. 25, 1955

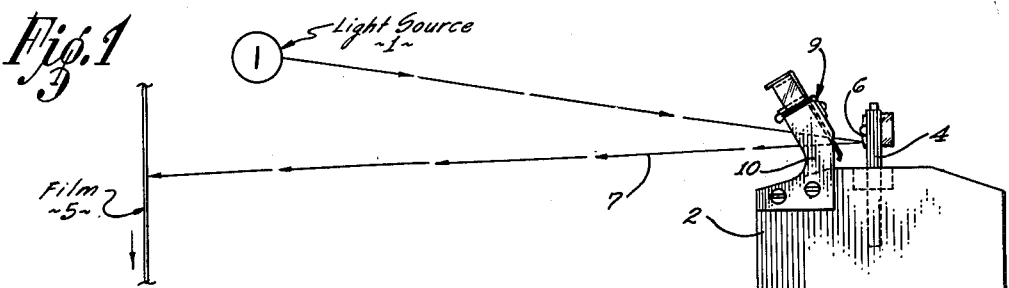
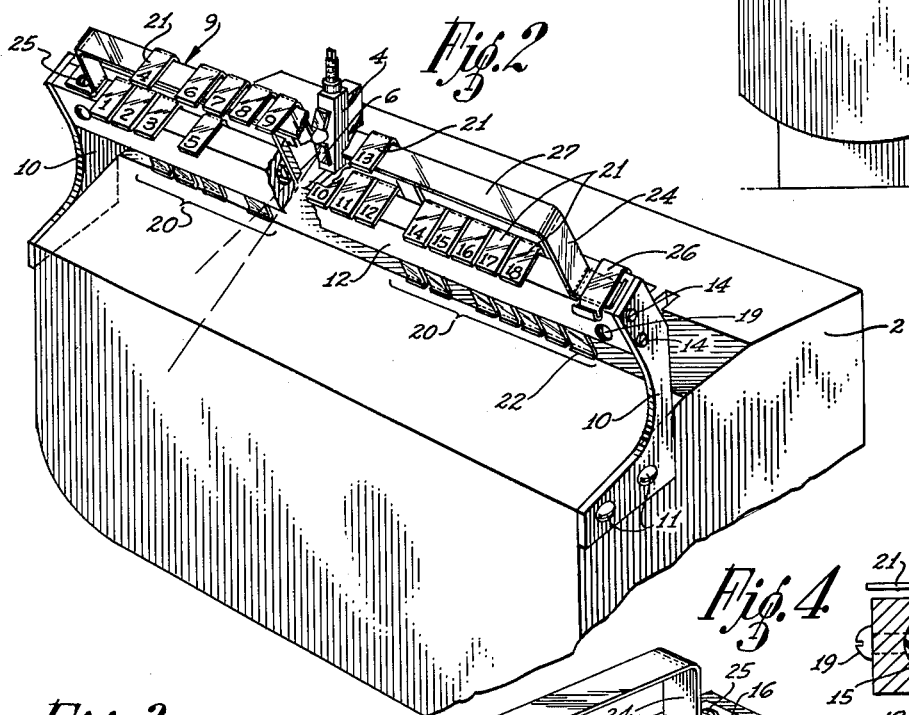
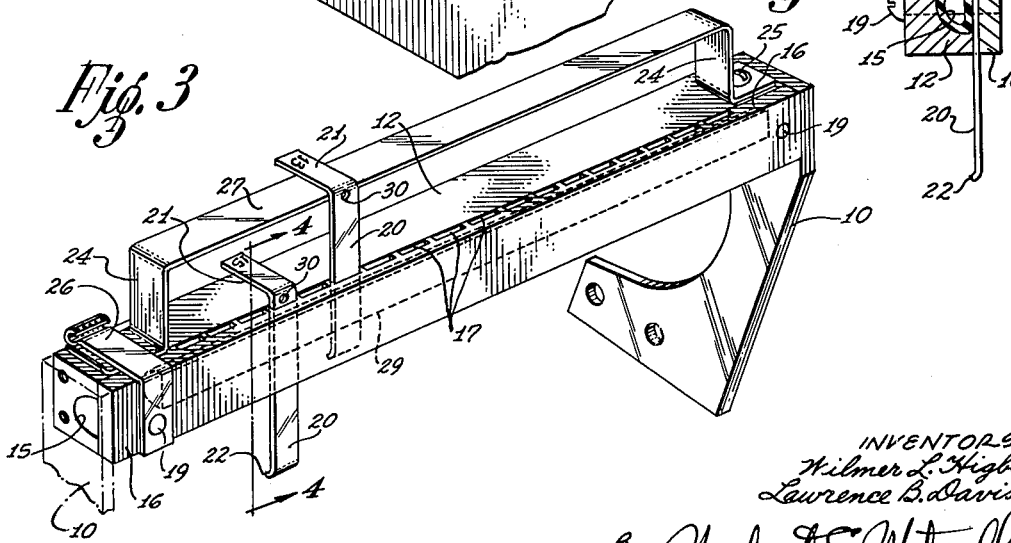
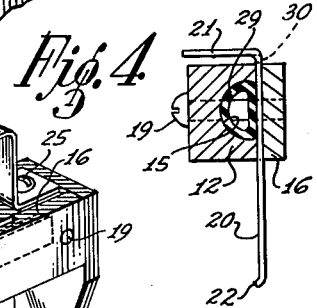

2,721,783

GALVANOMETER MASK

Wilmer L. Higbee, Redondo Beach, and Lawrence B. Davis, Inglewood, Calif., assignors to Northrop Aircraft, Inc., Hawthorne, Calif., a corporation of California Application April 9, 1954, Serial No. 422,222

7 Claims. (Cl. 346—145)

The present invention relates to instruments, and more particularly, to a mask assembly for blocking off the output of individual galvanometers, as desired, of an oscillograph.

Recording oscillographs commonly employ a magnetized galvanometer block into which are fitted a plurality of closely spaced, small galvanometers each having a tiny mirror exposed exteriorly of the block. Individual electrical leads are connected to a coil of each galvanometer for turning the mirror in accordance with a desired signal to be measured. Light from a single source is directed onto all mirrors at a small angle from the perpendicular, and the reflected ray from each mirror is thus displaced in proportion to the signal which causes the mirror to turn. The reflected ray may be directed to a viewing screen and/or a revolving reel of film for recording the information in relation to time. The whole machine is housed in a light-tight mounting case.

The oscillograph may have any number of channels, and the galvanometers have to be installed closely adjacent to each other to occupy a minimum amount of space. In addition, all galvanometers must be in place to insure accurate results even when only a few are to be simultaneously used during certain tests. Individual adjustments at the end of each galvanometer are usually provided to set the zero-signal position so that the traced record will be located conveniently on the recording paper or film.

Therefore, it is seen that, taking an 18 channel oscillograph as an example, the final record to be studied and used will carry 18 traces. These 18 traces are difficult to follow separately, since they will be crossing each other, overlapping, and superimposed at points where it is impossible to obtain correct results, and very time-consuming in trying to visualize the course of any one trace representing the information sought. Even if dummy galvanometers are placed in all channels except the particular ones to be used for a single test run, an excessive amount of time is consumed in changing and adjusting galvanometers between tests.

One unsuccessful method of solution has been to twist the zero-center position of each unused galvanometer so that its reflected light beam will not strike the record. However, this is not advisable because many galvanometers have been ruined by this action, and because resetting them to the proper place is tedious and again takes additional time. Moreover, even if a certain galvanometer is initially set off scale, the signal source to which it is still connected may cause it to deflect back onto the record at certain times during operation.

Another attempt that has been made during the several years of time this problem has existed, is that of sticking tape temporarily over the galvanometers whose trace is not desired to be recorded. Such makeshift procedures as mentioned do not, of course, adequately meet the situation.

Accordingly, it is an object of the present invention to provide a means of preventing unwanted galvanometer traces from appearing on the oscillograph record, so that the resulting information will be clearly presented and easily read.

Another object of this invention is to provide such means which will be permanently carried with the oscillograph and is extremely quick and simple to operate, thus reducing test set-up and changeover time to a minimum.

Other objects and advantages will be pointed out in the detailed description of a specific apparatus forming the main body of this specification.

Briefly, our invention comprises a support assembly slidably carrying a plurality of rectilinear acting shutters, one for each galvanometer channel, which are individually adjustable into and out of a position where each shutter blocks off the light path immediately in front of the mirror of the associated galvanometer only. The support assembly is adapted to be rigidly attached to the galvanometer block, in a location allowing ample access room for working with the galvanometers. Positive locking means are provided to hold the shutters out of blocking position.

One particular construction by which the foregoing is accomplished is disclosed in the accompanying drawings, shown by way of illustration and not limitation, wherein:

Figure 1 is an elevation view diagrammatically showing the parts of an oscillograph concerned with the present invention, with the shutter assembly mounted thereon.

Figure 2 is a perspective outline view of a galvanometer block having the present shutter assembly attached.

Figure 3 is a perspective view of the other side of the shutters, with one end support removed.

Figure 4 is a cross sectional view taken at the edge of one shutter as indicated by the line 4—4 in Figure 3, showing an internal shutter holding tube.

Referring first to Figure 1 for the detailed description of this preferred embodiment, the inside of an oscillograph contains a light source 1, galvanometer block 2 carrying a galvanometer 4, and a film 5 positioned as shown. The galvanometer 4 includes a mirror 6 which is caused to turn in a horizontal plane in an amount and direction corresponding to an electrical signal which reacts with the magnetic flux of the magnetized block 2. Other identical galvanometers 4 are located in line behind the one shown in Figure 1, and each is adjusted so that the reflected beam 7 from its mirror 6 is received at a desired position with respect to the width of the film 5. Other parts of the optical system, focusing lens, viewing screen, and the like, are not illustrated, but the same mirror 6 is used by light coming from the left from the single light source 1 for all oscillograph functions.

According to the present invention, a mask assembly 9 is mounted on the galvanometer block 2. As also shown in Figure 2, an end support leg 10 on each end of the mask assembly 9 is attached to the block 2 by mounting screws 11. A mounting bar 12 (Figures 2 and 3) is horizontally fixed between the upper ends of the legs 10 by bar screws 14. This holds the mounting bar 12 spaced above the block 2, allowing space for light to enter and be reflected out from the area on one side of the galvanometers 4. In the present drawings, an 18-channel oscillograph is illustrated.

The mounting bar 12 is formed with a U-shaped curved channel opening 15 on the side toward the galvanometers 4. The bar 12 is fixed in the legs 10 at a slight upward angle toward the galvanometers, for a purpose to be described later.

A rectangular retainer 16 having a plurality of adjacent slots 17, one for each galvanometer channel, is connected by retainer screws 19 to the bar 12 with the slots 17 overlying the channel 15. Each slot 17 forms a vertical guideway for a shutter 20 positioned therein. Most of the shutters are omitted from Figure 3 for simplification. The upper end of each shutter 20 is bent over 90° to form a numbered handle 21 which also rests upon the bar 12 when the shutter is lowered. The lower end of each shutter 20 is preferably curved slightly in a stop 22 to prevent the shutter 20 from being pulled upwardly out of the assembly.

Mounted on top of the bar is a lock 24 pivotally attached by a pivot screw 25 at one end and removably held in place by a spring catch 26 at the other end. Between the ends, the lock 24 has a raised ledge portion 27 positioned to fit just under the shutter handles 21 when the shutters 20 are raised, to positively hold them up. To change the position of any shutter 20, the lock 24 is forced slightly from under the catch 26, and swung in a plane about the pivot screw 25. Shutters are moved to the upper or lower position as desired, and the lock 24 is then snapped back closed under the catch 26.

Referring now to Figure 4, another means is provided to hold the shutters in position. Here, an elastic member such as a rubber tube 29 is shown positioned in the bar channel 15 and held in a somewhat compressed position next to the shutters 20, by the compressive action of the slotted retainer 16. The tube 29 is long enough to extend past all shutters, and ends just short of the retainer screws 19 within the assembly.

The shutters 20 are held down by the friction of the pressure thereon by the tube 29. As a matter of fact, they are also held up by this same force, which would be sufficient in most instances. However, the positive lock 24 is preferably incorporated to make absolutely certain that large magnitude shocks can not result in slipping down of the shutters 20. The slots 17 are a few thousandths of an inch deeper than the thickness of the shutters 20, to provide clearance for shutter movement.

From Figures 1 and 2, it can be seen how the present device operates. When in the lowered position, a shutter 20 reaches nearly to the top of the galvanometer block 2 and nearly to the side of the associated galvanometer 4, directly in front of the mirror 6 thereof. This position efficiently blocks the light from that galvanometer, so that no trace therefrom will appear at any of the oscillograph outputs. Thus, the shutters 20 can be used to effectively "disconnect" all undesired channels of information during each specific operation of a device or system being tested, for example, and be quickly retracted at the beginning of another operational period when the particular data from any previously connected and pre-set galvanometer is desired to be recorded.

The installed position of the mask assembly 9 at the angle illustrated allows both access to the top of the galvanometer block 2 from above (for installation and critical adjustments of the galvanometers), and the necessary close approach of the lower portions of the shutters 20 to the space immediately in front of each individual galvanometer mirror 6. As is evident from the drawings and description, no malfunction can possibly occur as a result of any shutter covering too little or too much of the light path space.

Since the shutters 20 are relatively small, about 5/32-inch wide in one actual embodiment, an additional feature is provided by a hole 30 drilled through each shutter 20 (Figure 3) just below the handle part 21. This hole may be engaged by the point of a hand tool (not shown) held down into the case of the oscillograph, for the purpose of raising or lowering the shutters 20. Of course, the shutters are also operable directly by hand.

It is thus seen that the use of the present invention solves the aggravating problem of how to eliminate or disable certain galvanometer circuits in a multiple-channel oscillograph. All necessary hook-ups can be made and let remain, all galvanometers can be left installed as required for accuracy, and yet the recorded results of each different test contain only the information specifically desired according to the purpose of each test or operation, and clearly presented to the eye. The same apparatus, slightly modified in its mounting means, can be used with any oscillograph operating with the reflected light beam principle. The mask assembly can be permanently installed, and all the previous makeshift and inefficient practices eliminated.

Whenever the terms "vertical," "horizontal," "up," and the like, are mentioned in this specification and in the following claims, it will be understood that these various directions are with reference to the position of the unit as shown in the present drawings, and that actually they may be in other directions if the whole unit is placed in some other position in space.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. An attachment for a galvanometer block in an oscillograph, comprising end support members adapted to be fastened to the oscillograph, mounting means fastened between the ends of said support members spaced from the galvanometer block, a plurality of shutter members slidably mounted in said mounting means and movable toward and away from the galvanometer block, and means at each end of said shutter members for preventing withdrawal in either direction from said mounting means, said mounting means comprising a bar having a substantially semicircular groove along one side thereof, a retainer having a plurality of slots cut from edge to edge along one side thereof, said slots forming respective clearance spaces for said shutters, said retainer fastened to said bar along the grooved side thereof, and an elastic member installed in said groove, said elastic member being compressed against said shutters when in place.

2. An attachment for a galvanometer block in an oscillograph, comprising end support members adapted to be fastened to the oscillograph, mounting means fastened between the ends of said support members spaced from the galvanometer block, a plurality of shutter members slidably mounted in said mounting means and movable toward and away from the galvanometer block, and means at each end of said shutter members for preventing withdrawal in either direction from said mounting means, and including means for positionally holding said shutters in position, comprising: a projection from the upper end of each shutter, a movable lock member having a ledge portion extending in parallel alignment with said mounting means on the opposite side thereof from the galvanometer block when in a locking position, said lock member being pivotally connected at one end to said mounting means to swing out of said locking position in a plane perpendicular to the sliding direction of said shutters, said projection of each shutter in said lowered position resting upon said mounting means, and said projection of each shutter in said raised position being just beyond said ledge of said lock member when in said locking position, and means for removably holding said lock member in said locking position.

3. In a multiple-channel oscillograph having a plurality of galvanometer actuated mirrors for reflecting beams of light onto a record; means for preventing the output of any undesired galvanometers from appearing on the record, comprising a holder assembly adapted to be rigidly attached to the mounting of said galvanometers, a plurality of opaque shutters, one for each channel of said oscillograph, each of said shutters being slidably mounted in said holder assembly to be rectilinearly movable into and out of a blocking position where it intercepts the beam of light immediately in front of its one associated galvanometer mirror only, the movement of said shutters being at an angle with said galvanometers so that the blocking ends of said shutters approach nearer to said galvanometers when moved into light-blocking position, each of said shutters having a curled stop at the blocking end thereof to prevent said shutters from being pulled out of said holder assembly, the opposite ends of said shutters being bent at a right angle, and including positive shutter lock means attached to said holder assembly and engageable with said bent opposite ends to lock said shutters out of blocking position.

4. Apparatus in accordance with claim 3 wherein said bent opposite ends are marked with visible numbers respectively identifying all shutters with their corresponding galvanometers.

5. In a multiple-channel oscillograph having a plurality of galvanometer actuated mirrors for reflecting beams of light onto a record; means for preventing the output of any undesired galvanometers from appearing on the record, comprising a holder assembly adapted to be rigidly attached to the mounting of said galvanometers, a plurality of opaque shutters, one for each channel of said oscillograph, each of said shutters being slidably mounted in said holder assembly to be rectilinearly movable into and out of a blocking position where it intercepts the beam of light immediately in front of its one associated galvanometer mirror only, the movement of said shutters being at an angle with said galvanometers so that the blocking ends of said shutters approach nearer to said galvanometers when moved into light-blocking position, said holder assembly comprising a pair of vertical supports each having means at one end thereof for attachment to a galvanometer block, a bar element fixed between the other ends of said supports at a predetermined height and parallel to said support attachment means, one side of said bar element facing toward said galvanometers and slightly upwardly, a retainer element removably secured in contact with said one side of said bar element, means defining a lengthwise channel in one of said elements with the open side of said channel terminating at the junction of said elements, means defining a plurality of slots in one of said elements and perpendicular to said channel adjacent said open side thereof, said slots lying in a plane parallel to said one side and being dimensioned to respectively receive said shutters with a slight clearance, and a resilient member installed in said channel to bear against all said shutters in frictional engagement, whereby said shutters can be moved along said slots against the side-pressing force of said resilient member.

6. Apparatus in accordance with claim 5 wherein said channel is in said bar element, and said slots are in said retainer element facing said bar element.

7. In a multiple-channel oscillograph having a plurality of galvanometer actuated mirrors for reflecting beams of light onto a record; means for preventing the output of any undesired galvanometers from appearing on the record, comprising a holder assembly adapted to be rigidly attached to the mounting of said galvanometers, a plurality of opaque shutters, one for each channel of said oscillograph, each of said shutters being slidably mounted in said holder assembly to be rectilinearly movable into and out of a blocking position where it intercepts the beam of light immediately in front of its one associated galvanometer mirror only, the movement of said shutters being at an angle with said galvanometers so that the blocking ends of said shutters approach nearer to said galvanometers when moved into light-blocking position, each of said shutters having a lock-engaging element at the end opposite said light-blocking end, and including a lock member connected to and extending above said holder assembly, said lock member having a straight elongated platform portion normally positioned just beneath said lock-engaging elements when said shutters are thereby held out of blocking position, and movable spring-loaded means for holding said lock member in its normal position.

References Cited in the file of this patent

UNITED STATES PATENTS

| | | |
|---|---|---|
| 1,194,951 | Burtis | Aug. 15, 1916 |
| 1,984,683 | Jenkins | Dec. 18, 1934 |
| 2,506,599 | Jordan | May 9, 1950 |
| 2,645,552 | Stevinson | July 14, 1953 |